UNITED STATES PATENT OFFICE.

JULIUS RHEINBERG AND ERNEST RHEINBERG, OF LONDON, ENGLAND.

COLOR PHOTOGRAPHY AND COLOR-PRINTING.

1,191,034.

Specification of Letters Patent. Patented July 11, 1916.

No Drawing. Application filed August 31, 1914. Serial No. 859,502.

*To all whom it may concern:*

Be it known that we, JULIUS RHEINBERG and ERNEST RHEINBERG, both subjects of the King of Great Britain, residing at London, England, have invented new and useful Improvements in Color Photography and Color-Printing, of which the following is a specification.

This invention relates to improvements in color photography on opaque and transparent media and color printing, effected by turning a multicolor screen which acts wholly or in part on the principle of additive color mixing into one which acts on the principle of subtractive color mixing.

In additive color mixing the separate color elements in the form of fine lines or dots are placed side by side and the color perceived by the eye is due to the addition of the neighboring patches of color since the eye blends or fuses them together. Screen plate photography as practised at the present time affords an example of this principle.

In subtractive color mixing the separate color elements are not side by side but superimposed. Dyes or pigments are used which when spectroscopically analyzed are found to transmit overlapping regions of the spectrum. Only these overlapping portions reach the eye the other portions being blocked out or subtracted. Color photography by means of three superimposed films affords an example of subtractive color mixing.

In additive color mixing it is desirable to select colors formed by dividing up the spectrum into not less than three definite parts, which do not overlap each other, and since white is best formed by a mixture of the primary colors, red, green and blue-violet, these are the colors mostly chosen for screen plates employed for color photography.

In subtractive color mixing it is usually found desirable to use colors complementary to the primaries, technically known as minus blue, minus green and minus red. The minus blue will pass red and green and look a yellow color. The minus green will pass red and blue and look magenta-red, and the minus red will pass blue and green and will look greenish-blue. In color photography by this subtractive method, films stained in these three colors have either been superimposed, or one film has been caused to absorb the color from three separate positives stained in minus colors, which were successively applied to it.

The main object of the present invention is to combine the advantages of the additive method for taking photographs with the subtractive principle of viewing them, by converting a transparency or print made in accordance with the additive principle into one acting in accordance with the subtractive principle.

Color photographs or color prints by processes of subtractive color mixing have hitherto suffered from the great disadvantage that their production not only usually involves taking three separate color recording negatives but also necessitates three separate colored positives whereas in screen plate color photography, in which the additive color mixing principle is made use of, there is no necessity for more than a single negative and a single positive. On the other hand however such positives have the drawback that a considerable loss of light is occasioned in viewing them, for seeing that white is represented in such positives by a surface covered with red, green and violet color patches, it is clear that a colored surface of this description can only transmit or reflect a fraction, roughly a third, of the white light impinging on same. This is the chief reason why such positives are as a rule made on glass for viewing by transmitted light, and why the application of the process to paper prints has not met with much success. Processes which make use of the subtractive color mixing principle are free from this drawback, for in these any white portion of a positive is free from color patches, and therefore capable of transmitting or reflecting the maximum amount of the white light impinging on it.

Our present invention enables us in a process of color photography to combine the advantages of screen plate methods which need but a single negative with the advantages of the subtractive color mixing methods. Thus we obviate loss of light and obtain pure whites free from color patches. Photographs or prints so produced are obviously advantageous for many purposes where the maximum of light reflecting or light-transmitting power is desirable, for example in color photographs on paper, cinematographs films, etc. To attain this result we employ in the production of the negative an ordinary regular pattern screen plate (hereinafter referred to as the taking color screen) i. e., a plate covered with fine dots of microscopic size or lines of microscopic breadth preferably in the usual colors for additive color mixtures e. g. red, green and violet. In the production of the positive, another color screen is employed (hereafter referred to as the viewing color screen) which may be on a transparent or opaque foundation, and which is covered with fine dots or lines in the same regular pattern as that used for the negative, so that it registers with the same, but in which the colors are of the kind used in subtractive color mixing, namely, minus red, minus green and minus blue, in other words greenish blue, magenta and yellow respectively.

The fact of the colors used being those ordinarily employed for subtractive color mixture does not in itself condition that the screen acts according to that principle, in fact so long as the screen is not treated in any way and the separate color patches lie next to one another it acts on the eye according to the principle of additive color mixture, but we turn this viewing screen into one which acts according to the principle of subtractive color mixture, by getting rid of the colors in part and causing those left to run into one another or mix. The getting rid of the colors may be effected by dissolving them out, by bleaching them away by the action of light, or in one modification of our process by simply covering them by a white or tinted deposit or pigment. The mixing of the colors may be effected by chemicals which cause them to transfuse into one another, or by the action of heat or mechanical pressure or both on the film forming the vehicle of the colors. It is this process of changing a color screen acting on the additive color mixing principle into one which acts according to the subtractive color mixing principle, which forms one of the chief features of our invention, for we hereby attain increased darkness in the blacks of the picture, increased brilliancy in the color effects, besides much truer color rendering of the picture as a whole.

The rendering of the blacks of the picture forms indeed a very simple criterion as to whether a picture acting on the eye by the principle of additive color mixtures has been converted into one which acts wholly or in part on the principle of subtractive color mixtures, as it is evident that without altering the colors of the original screen in any way, no darker surface than that which it shows originally can be brought about, unless the colors have been transfused into one another so as to bring in the effect on the eye of subtractive color mixtures.

The actual process of making a color photograph is as follows:—Using the taking color screen, we prepare a negative on a separate panchromatic plate in the ordinary way. The taking screen is not required any further and can be used again for other photographs. It is convenient to consider the appearance of the finished negative where a white object, a black object, and a colored object (for instance a red object) have been photographed. Where the white object occurs the film is darkened all over because the red, the green and the blue lines or dots have all allowed the light to act through the same. Where the black object occurs the negative remains clear all over; where the red object occurs, places corresponding to those where the light passed through the red lines or dots are darkened, the remainder corresponding to the places where the green and violet lines or dots occurred on the screen plate being left clear. We now take a viewing color screen consisting say of a film of soft gelatin or any other suitable colloid, colored with the corresponding minus colors and which has been sensitized with any suitable medium such as potassium bichromate, and expose this through the negative taking care that it registers in such a way that the lines or dots of the negative corresponding to the red lines or dots of the taking color screen, are superimposed on the minus red (i. e. greenish-blue) lines or dots of the viewing screen. Similarly the lines or dots of the negative corresponding to the green and blue-violet lines or dots of the taking screen, must respectively register with the minus green (i. e. magenta) and minus blue i. e. yellow lines or dots of the viewing screen. The viewing screen is now treated in exactly the same way as if it were an ordinary carbon print, this is to say, it is transferred on to a support which may be temporary or final and is developed in water. This will dissolve out the screen entirely in the white portion of the picture, all the colors will be left in the black portion of the picture the yellow lines or dots consisting of red plus green, and the magenta lines or dots consisting of red plus blue will be left in the red portion of the picture. We now act upon the screen with any chemical, such as a solution of ammonia for instance which will act on the gelatin and cause the neighboring color dots to run into one another or mix thereby producing the desired subtractive color effects. If desirable, we may facilitate this transfusion by applying heat to the color screen. The white parts of the picture will have been left free from all color, the black parts will now appear black or very dark just in the same way as when the three minus colors are superimposed in ordinary three color printing, the red parts of the picture will appear red because the yellow (red plus green) lines or dots and the magenta (red plus blue) lines or dots have run into one another, and now chiefly transmit or reflect the common component red. Finally we may if desired re-transfer the screen on to a final support. To secure better gradation of colors this final support may take the form of an ordinary black and white or monochrome positive, on to which the screen is transferred in register.

We may vary the process in many different ways, always retaining the main feature of mixing, transfusing or intermingling the adjacent color elements of the resultant picture, in such a way as to give rise to subtractive coloration in the place of additive coloration. We give the following instances of variations:—Instead of exposing the sensitized viewing screen through the negative, we may expose it through a positive made from the negative. In this case it is necessary to use in the manufacture of the viewing screen dyes which have the property of penetrating soft gelatin readily, but hardened gelatin very slightly, or not at all. After exposure the viewing screen is washed to eliminate the soluble portions of the sensitizing agent and a paper or other support coated with soft gelatin is then squeegeed on to it. In the presence of moisture the colors of those portions of the screen which have remained unaffected by light are gradually absorbed by the soft gelatin in contact with it, while the colors in the other portions remain imprisoned in the hardened gelatin. In this case the spreading action of the imbibition process may render a supplementary mixing of the adjacent color elements unnecessary. In order to obtain complete contact or to assist inhibition it may in some cases be desirable to apply pressure.

Instead of taking a soft colloid viewing screen which has been sensitized with a medium such as potassium bichromate having the property of becoming hardened on exposure to light, we may take one which has been sensitized with ferric chlorid or other chemical having the property of hardening the film, which hardened film is reconverted into a soft film by exposure to light. The viewing screen may then either be exposed through the negative and the color of the softened part transferred by imbibition as previously described or the negative may be converted into a positive by the usual means and the viewing screen exposed through this, and the softened part dissolved out in hot or cold water according to the colloid used, the adjacent colors of the resultant picture being caused to spread or transfuse into one another in the manner already indicated.

We may vary the vehicle of the viewing color screen itself by using instead of gelatin, collodion or a similar substance, the surface of which is coated with a film of gelatin, fish-glue or the like, which is sensitized with a suitable medium, such as ferric chlorid. The exposure is then made through a positive transparency and the sensitized film developed in water. The colors in the collodion film underlying the portions of the sensitized film which were not acted upon by light are now protected by a hardened "resist." We thereafter act upon the collodion viewing film with a suitable chemical, for example a mixture of alcohol and ether, which will either dissolve out the colors, from those parts of the screen which are free from the gelatin resist, or bleech them. We next transfer the collodion color screen on to paper or other medium. collodion side outward, and act upon it with a suitable chemical, for instance ether, which will cause the neighboring dots to run into one another or mix, thereby producing the desired subtractive color effect.

In place of developing the sensitized resist after exposure by getting rid of the substance of the resist in parts, we may act upon the collodion screen underneath, and extract the colors from same selectively through the substance of the resist, by virtue of the fact that the exposure has changed its degree of hardness or its permeability to the action of the solvents employed for this purpose. A suitable method of doing this is to coat the viewing screen, made of collodion for example, with a resist of albumen for example, mixed with any sensitive salt which confers on it the property of rendering it selectively harder or softer, or which changes its degree of permeability to suitable solvents after exposure to light, or the screen may be first coated and then sensitized with salts having such a property. A great variety of salts confer this property on colloid films, some rendering them softer or more permeable, others harder or less permeable, on exposure to light. As instances may be mentioned, bichromate of potash or ammonia, ferric chlorid with or without a proportion of tartaric, citric, or oxalic acid, ferric oxalate, double salts such as ferric ammonium citrates, uranium salts, such as uranium nitrate, and salts of many other metals, singly or in combination. In some cases the salt is more or less incorporated with or precipitated in the colloid, in others it appears to act chiefly by forming a surface layer. In every case it plays the part of a resist which changes its degree of permeability to the solvent used for extracting the colors out of the color screen below in proportion to the amount of light allowed to fall upon it.

According to the colloids selected for the color screen and for the resist, either of which may be in collodion, celluloid, gelatin, albumen, casein, or any other colloid or mixture of colloids, so the solvent used for the sensitizing salts, and the solvent used for extracting the color from the color screen will vary. In the example mentioned above of a collodion color screen with an albumen resist, we may for instance sensitize in a watery solution of the sensitizing salt, to prevent any action taking place during sensitizing on the colors in the collodion screen, and we may then for instance extract the colors after exposure with acidified alcohol.

Just as we may extract the colors from the colloid film containing them through the resist, so we may also cause the color lines or dots to run into one another or mix, by the action of a chemical through the resist. Or the process of getting rid of the colors in parts, and mixing the remainder may be done simultaneously by any suitable chemical, such as alcohol with a large proportion of ether. In general it will be seen therefore that we can either dissolve away the vehicle of the colors along with the colors themselves where not wanted, or dissolve or bleach out the colors from the vehicle, or transfer the colors from the vehicle on to a separate support, in each case subsequently causing the adjacent colors to mingle or transfuse in so far as this may not have been already effected by the preceding process.

Instead of employing dyes for the colors of the viewing screen we may employ pigments. They may be incorporated in a suitable vehicle or printed upon a suitable material.

The viewing color screen may be upon paper or any other opaque or transparent medium, and it may be transferred to paper, or any other medium, either after completion or at any previous stage. This transference may be effected by bodily removing the film containing the colors, or by transference of the colors alone into a moistened absorbent surface, preferably under pressure, and sometimes also under the application of moderate heat.

In all cases in order to secure better gradations of colors and half tones we may arrange for contact or superimposition of the color picture on an ordinary black and white or monochrome positive.

Variations may be made by using viewing screens impregnated with dyes having various characteristics by suitable modifications of the process (the case of dyes which are only absorbed by soft gelatin has already been mentioned) maintaining always the main features of getting rid of the colors not wanted and causing the others to transfuse into one another. We may as a further instance use for the colors of our viewing screen dyes which have the property of bleaching under the action of light, of which many are known, such as for example the cyanin dyes, pinachrome, etc. A collodion viewing screen for example made with alcoholic solutions of such dyes (containing also a small proportion of glycerin) may be sensitized by known reagents, for example in anethol, exposed under a positive in exact register, thus bleaching away the colors not required, and then de-sensitized by means of other known reagents, such as for instance oil of cloves, after which the colors are transfused by one of the methods already described.

In another modification of our process, we entirely or partly dispense with the necessity of bleaching or dissolving the colors out of the viewing screen. In this method we employ as our resist a colloid made opaque with a white or colored pigment which has been sensitized by a suitable medium, say with ferric chlorid, and we expose the pigmented colloid film through the negative. The colloid film is next developed in the usual way, or it is submitted to the action of a solvent which dissolves out the pigment in the part acted upon by the light during exposure. In either case the result is that the white parts of the picture are now represented by opaque white pigment, the black parts of the picture are clear. The viewing color screen may be coated with the pigmented colloid film, before the latter is exposed, or it may be transferred to same after exposure, due care being taken that the lines or dots on the picture corresponding to red, green and blue in the taking color screen register with the lines or dots corresponding to minus red, minus green and minus blue on the viewing color screen. The lines or dots on the latter not protected by the resist, are now mixed by the action of a suitable solution, such as alcohol, ether and ammonia as in the other modifications of our process.

In order now to enumerate in concise form the various stages of producing a color photograph by our new process, suppose we desire to produce a picture in colors on paper of a bunch of flowers with a white background, then a typical instance of our procedure would be as follows:

1. *Production of a black and white positive.*—We take an ordinary multicolor screen with alternating dots in the usual additive colors, red, green and violet and exposing the bunch of flowers through this screen in contact with a suitable photographic plate, we proceed to produce a black and white negative or positive by known processes.

2. *Exposure of the multicolor viewing screen.*—We take a multicolor screen (coated with a suitable light sensitive resist) and with the dots arranged similarly to the multicolor screen employed under 1 except that the alternating dots are in the subtractive colors, minus red, minus green and minus violet. We bring the screen into contact and in register with the black and white positive and then expose the color screen to light through the positive.

3. *Conversion of the multicolor viewing screen into a multicolor picture acting on the eye by the principle of additive color mixing.*—We do this by submitting the multicolor screen to the action of solvents which permeate the resist and dissolve out colors from the film under the resist in proportion to the action of light on the resist during exposure. The solvent will depend on the colloids in the color screen and in the resist. If the color screen is in collodion, alcohol will be the chief ingredient of the solvent. For example acidified alcohol is advantageously used with color screens of collodion and resists of albumen.

The black and white positive would be clear and free from deposit, in the part which corresponded to the white background of the flowers. Through this clear part of the positive the light acts strongly on the light sensitive resist during exposure of the multicolor viewing screen. Through this particular part of the resist the solvent now acts strongly and completely extracts the color from the multicolor film. The white background of the flowers is therefore now represented by a portion of the multicolor screen freed from all colors. Similarly through the parts of the black and white positive which represent the colored flowers, the solvent will extract the colors from the film under the resist selectively, so that a multicolor picture of the flowers results, but in so far as the different colors of the dots in the film are still separate and distinct the eye can only blend them optically and at this stage they still act on the principle of additive color mixing.

4. *Changing the multicolor picture as obtained in 3 above into one acting on the principle of subtractive color mixing.*—We do this by submitting the multicolor screen picture to the action of solvents which cause the adjacent color dots to run or transfuse into one another. For example a red flower would after stage 3 be represented by alternate minus green, minus violet and clear dots (i. e., magenta, yellow and clear dots) but after the transfusing action, the colors of these dots would no longer be separate and distinct but would be actually mixed or blended forming red, so that they then act on the eye mainly on the principle of subtractive color mixing.

5. *Transferring the picture to paper.*—If the multicolor viewing screen was on glass we now back it with white paper, or transfer the film to white paper by known processes.

The foregoing exemplifies a typical instance of carrying out one modification of our method. Other modifications have been referred to.

We claim:

1. In color photography, the method of converting a picture, which comprises color elements of microscopic size of a multicolor screen acting on the eye by the principle of additive color mixtures, into one which acts on the eye by the principle of subtractive color mixtures, such method consisting in transfusing the colors of adjacent color elements into one another.

2. In color photography, the method of converting a picture, which comprises color elements of microscopic size of a multicolor screen acting on the eye by the principle of additive color mixtures, into one which acts on the eye substantially by the principle of subtractive color mixtures, such method consisting in partially transfusing the colors of adjacent color elements into one another.

3. In color photography, the method of converting a picture, which comprises color elements of microscopic size of a multicolor screen acting on the eye by the principle of additive color mixtures, into one which acts on the eye by the principle of subtractive color mixtures, such method consisting in transfusing the colors of adjacent color elements into one another by means of solvents.

4. The method of producing a multi-colored picture consisting in preparing by means of a taking color screen which has color elements of microscopic size a photograph on a transparent medium, causing this photograph to register with a multicolor photograph which has a colloid film with colored areas corresponding to but complementary to those of the taking color screen and a superposed light-sensitive layer, exposing this color screen through the said photograph, developing it, and treating it so as to cause the colors of adjacent color elements to run into one another.

5. In color photography, the method of producing a multi-colored picture consisting in preparing by means of a taking color screen which has color elements of microscopic size a photograph on a transparent medium, causing this photograph to register with a multicolor screen which has a colloid film with colored areas corresponding to but complementary to those of the taking color screen and a superimposed colloid film sensitized with media which render the colloid sensitized therewith impermeable to solvents to which after exposure to light it becomes permeable in proportion to the exposure, exposing this color screen through the said photograph, developing it, and treating it so as to cause the colors of adjacent color elements to run into one another.

6. A method of producing a multi-colored picture consisting in preparing by means of a taking color screen which has color elements of microscopic size a photograph on a transparent medium, causing this photograph to register with a multicolor screen which has a colloid film with colored areas corresponding to but complementary to those of the taking color screen and a superposed light-sensitive layer, exposing this color screen through the said photograph, developing it, and then placing it in contact with an absorbent surface in a moistened condition so as to cause the colors of adjacent color elements to run into one another as they pass out of the screen into said absorbent surface.

7. A photographic picture in color, composed of selected parts of a single multicolor screen, with the colors from adjacent elements of these selected parts transfused into one another.

JULIUS RHEINBERG.
ERNEST RHEINBERG.

Witnesses:
HERBERT D. JAMESON,
O. J. WORTH.